Figures 1, 2:
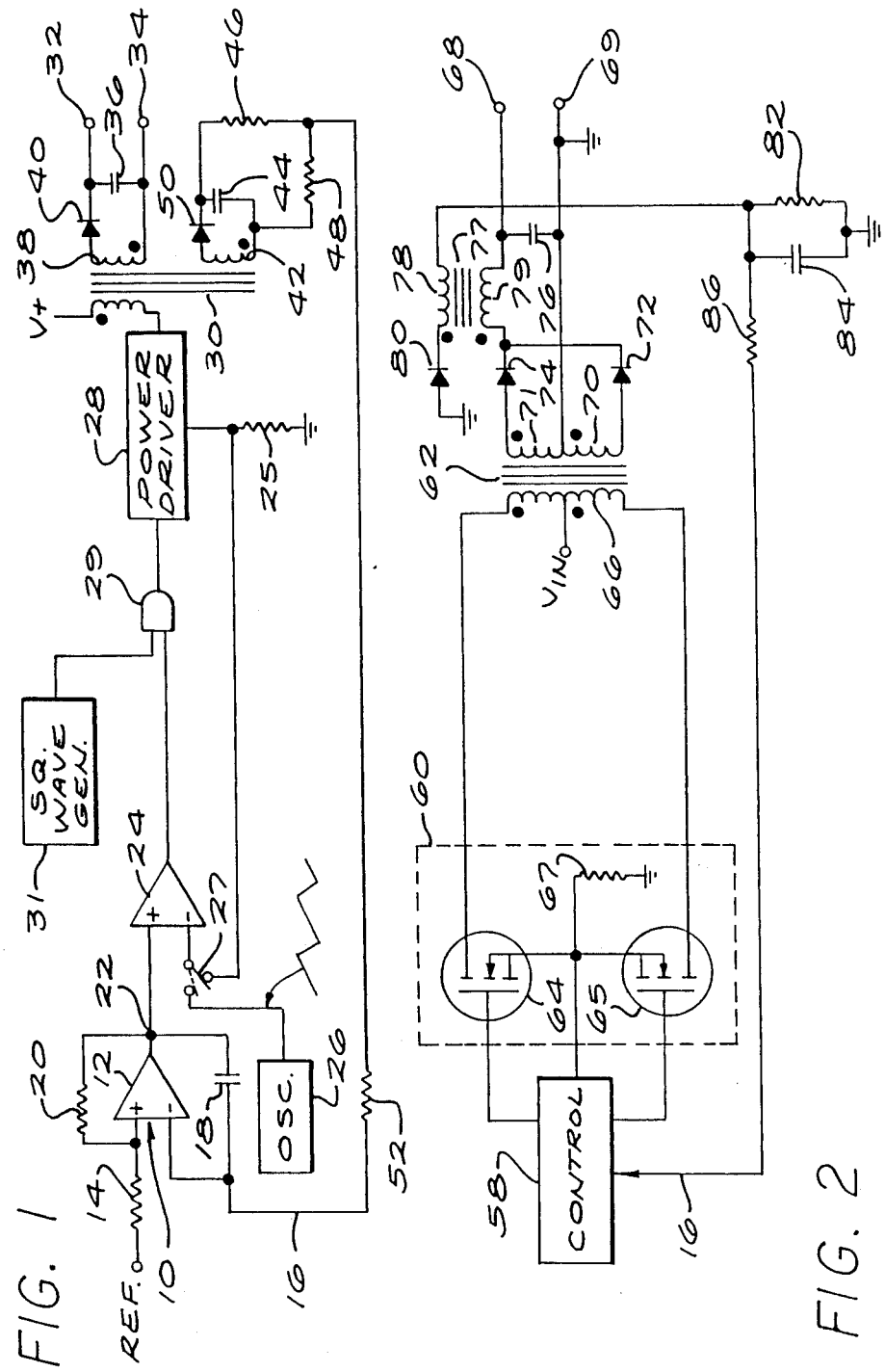

United States Patent [19]

Barlage

[11] Patent Number: 4,858,094
[45] Date of Patent: Aug. 15, 1989

[54] SWITCHED MODE POWER SUPPLY WITH IMPROVED LOAD REGULATION

[75] Inventor: Francis M. Barlage, Tucson, Ariz.

[73] Assignee: Allied-Signal Inc., Morris Township, Morris County, N.J.

[21] Appl. No.: 259,218

[22] Filed: Oct. 18, 1988

[51] Int. Cl.[4] .......................................... H02M 3/335
[52] U.S. Cl. ........................................ 363/21; 363/26; 363/41; 363/97; 330/104; 330/260; 330/291
[58] Field of Search ........................... 363/18–21, 363/24–26, 41, 95, 97; 323/280; 330/104, 260, 291, 292, 294

[56] References Cited

U.S. PATENT DOCUMENTS

| | | | |
|---|---|---|---|
| 4,125,813 | 11/1978 | Cubbison, Jr. | 330/104 |
| 4,128,866 | 12/1978 | Doerre | 363/15 |
| 4,144,463 | 3/1979 | Sugiura | 307/75 |
| 4,245,150 | 1/1981 | Driscoll et al. | 235/92 FP |
| 4,281,377 | 7/1981 | Evans | 363/63 |
| 4,287,556 | 9/1981 | Borland | 363/41 |
| 4,287,557 | 9/1981 | Brehse | 323/280 |
| 4,302,726 | 11/1981 | Shobbrook | 330/260 |
| 4,317,165 | 2/1982 | Sullivan | 363/41 |
| 4,326,245 | 4/1982 | Saleh | 363/79 |
| 4,425,613 | 1/1984 | Shelly | 363/26 |
| 4,429,236 | 1/1984 | Nitschke | 396/362 |
| 4,584,635 | 4/1986 | MacInnis et al. | 363/25 |
| 4,672,518 | 6/1987 | Murdock | 363/21 |

Primary Examiner—Peter S. Wong
Attorney, Agent, or Firm—Robert C. Smith

[57] ABSTRACT

Improved load regulation is provided in a switched mode power supply having an integrator, with a controlled reference signal connected thereto, a comparator circuit and a square wave generator, connected to the terminals of an AND circuit, and AND circuit connected to a power driver outputting to a transformer having two secondary windings. A current sensing resistor connected to the power driver is fed back to the comparator where this current level is compared with the integrator output. A first secondary winding is connected through a diode to the load with a capacitor connected across the load and a second secondary winding is connected in a feedback line to the integrator with a series diode, a capacitor is connected across the second secondary winding with a voltage divider connected across the second secondary line in parallel with the capacitor. The above arrangement is for current mode topology and an alternate arrangement is shown for voltage mode topology. A separate embodiment is disclosed for use with a push-pull type of switching power supply.

10 Claims, 1 Drawing Sheet

SWITCHED MODE POWER SUPPLY WITH IMPROVED LOAD REGULATION

The present invention relates to switched mode power supplies and more particularly to such power supplies having improved load regulation through positive feedback.

Two common types of switching power supplies or switched mode power supplies are the push-pull and fly back types. In either type, precise control of the output with varying loads is usually impossible without some type of output sensing circuit and feedback such as transformer feedback, opto-coupler feedback, or direct coupled feedback. All three types have disadvantages; transformer coupling or opto-coupler feedback require additional circuitry and direct coupled feedback loses the isolation between primary and secondary. In all of these cases, additional parts would be required to provide precise control of the output.

In a normal fly back design (with one output winding and one feedback winding), as the output load varies, the output voltage varies in response to changes in the diode characteristics and internal resistances, such as line drops and transformer winding resistance.

One type of remote sensing for the push-pull embodiment, which is easily implemented and which requires few parts, is accomplished by coupling a signal from an output inductor into a feedback line. In this case, the feedback signal is quite similar to the feedback signal in the flyback embodiment. For both cases the feedback signal is normally connected to an integrating circuit in the controller to provide negative feedback for stabilization where it is effectively compared with a reference signal. The combined signals i.e. the output of the integrator, is connected to an operational amplifier where it is compared with the output of an oscillator producing a sawtooth voltage output. This comparator essentially constitutes a pulse width modulator which supplies an output to a power driver circuit which supplies energy to the output transformer stage. The amount of energy delivered to the output stage will vary with the width of pulses supplied to the power driver stage.

The secondary power winding of the transformer output stage in the flyback embodiment is connected to the load and the power which it delivers is supplied through a diode. A substantial increase in load will cause a significant increase in voltage drop through the diode and through any resistance components in the output circuit including that of the output winding itself. It is this voltage drop which is undesirable and which it is desired to correct, preferably without resorting to elaborate additional external feedback arrangements requiring significant numbers of parts and without losing the isolation between primary and secondary sections.

In fly back power supplies, however, the energy supplied is proportional to the square of the peak current in the transformer primary. This peak current value is raised or lowered by changing a d.c. level, which, via the comparator circuit discussed above, increases or decreases the "on time" of the pulse width modulator and thereby changes the energy level passing through the output transformer. The energy reaching the output is equal to the square of the output voltage divided by the output load resistance. Thus the changes in output voltage are almost directly proportional to changes in the primary current. Thus, as the load changes the peak current may be sensed, providing a signal at the pulse width modulator which is substantially proportional to these changes. By using this signal it is possible to appreciably improve the load regulation. In its simplest form, this invention provides a single resistor around an integrator which provides positive feedback to the comparator (pulse width modulator) to bias the reference signal in a direction to compensate for the changed output voltage due to load changes.

In the drawings:

FIG. 1 is a schematic diagram of a fly back type switching power supply incorporating my invention; and FIG. 2 is a schematic diagram of a push-pull type switching power supply incorporating my invention.

Referring now to FIG. 1, a switching type power supply circuit is shown having an integrator 10 including an operational amplifier 12 which has a closely controlled reference signal connected to its non-inverting input terminal through a resistor 14. A feedback signal is connected to the inverting input terminal of operational amplifier 12 through a line 16. A capacitor 18 is connected between line 16 and the output of the operational amplifier 12. A resistor 20 is connected between the non-inverting input terminal of operational amplifier 12 and its output at a junction 22. The signal appearing at junction 22 which constitutes the output of integrator 10 is supplied to the input terminal of a comparator 24. Comparator 24 provides a signal to "AND" gate 29 resulting in a series of pulses to a power driver 28 which is connected to and drives the input winding of an output transformer 30. The effective width of the pulses supplied to power driver 28 will vary depending upon the voltage appearing at junction 22. A current sensing resistor 25 senses the peak current in the power driver and feeds this current signal back to a switch 27 connected to the inverting terminal of comparator 24. This effectively terminates each pulse when the peak current reaches the level of junction 22, which is changing in response to load changes. Load change across terminals 32, 34 are sensed as changes in the voltage across secondary winding 42. These changes appear at the inverting terminal of operational amplifier 12 and effectively change the d.c. level at junction 22. Therefore, because output voltage is proportionally linear with peak primary current and because junction 22 directly controls peak primary current and because the addition of resistor 20 causes the voltage at the non-inverting terminal of amplifier 12 to proportionally vary with output load, it is possible to set the ratio of resistors 14 and 20 such that errors caused by the output load varying are very significantly reduced.

The load for the system is connected across a pair of terminals 32, 34 which are connected across a capacitor 36 and a secondary winding 38 of transformer 30. A diode 40 is connected in series with one end of winding 38 and terminal 32.

An additional secondary winding 42 forms part of transformer 30 and has connected thereacross a capacitor 44 and a voltage divider consisting of resistors 46 and 48. A diode 50 is connected to one end of winding 42. Feedback line 16 including a series resistor 52 is connected to the junction between resistors 46 and 48. Resistor 52 and capacitor 18 effectively determine the time constant of integrator 10 as is well understood in the art.

The arrangement discussed above contemplates correction for a current mode topology. A voltage mode topology correction may also be accomplished. An oscillator 26 is connected through an alternate position of switch 27 to the inverting terminal of comparator 24. The comparator 24 compares the sawtooth voltage output of oscillator 26 with the d.c. level at junction 22. A change in the d.c. level will change the average "on" time of the pulses from "AND" gate 29, which causes the power driver 28 to compensate for voltage changes resulting from the changes in load. Note that oscillator 26 is usually, but does not have to be, synchronized to square wave generator 31.

A push-pull type of switching power supply is shown in FIG. 2. In this embodiment the control 58 includes the parts which are the same as those described above with respect to FIG. 1; the power driver 28, output section and feedback section are separately shown. Feedback line 16 is connected to the inverting terminal of an operational amplifier in control 58 which is the same as operational amplifier 12 of FIG. 1.

The comparator output of control 58 is supplied to a power driver circuit 60 which differs from circuit 28 of FIG. 1 essentially in that it has a push-pull output to the output transformer 62. This driver stage which includes a pair of MOSFET drivers 64, 65 provides power to opposite ends of a primary winding 66 of output transformer 62. A current sensing resistor 67 senses changes in the energy level at the driver stage 60 and supplies a feedback signal to control 58. As discussed above, this current change causes a change in the output of the comparator and thus of the energy of the pulses to the driver 60.

The load which is connected across terminals 68, 69 is fed from the push-pull output winding 70, 71. Each half cycle of the load in connected through a diode, winding 70 being connected to diode 72 and winding 71 being connected to diode 74. A capacitor 76 is connected between the output terminals.

Connected in the output circuit downstream of the diodes 72, 74 is a choke 77 having a secondary winding 78 directly coupled to primary winding 79. Connected in series with winding 78 between winding 78 and ground is a diode 80. The opposite side of winding 78 is connected to a filter circuit consisting of a resistor 82 and a capacitor 84. The filtered feedback signal is then fed through line 16 and a series resistor 86 to the inverting input of operational amplifier in control 58, as described above.

Operation of the regulation arrangement is essentially as described above. The feedback arrangement is somewhat different in the use of a winding coupled to an output choke. In each version the feedback signal is effectively isolated from the output circuit by being transformer coupled to the output. In each of the modifications shown the resistor 20 is connected across the operational amplifier 12 to provide a positive feedback component. The value of resistor 20 must be chosen to provide just enough positive feedback to give the desired compensation for load changes without causing oscillation. In one design Applicant has assigned values of 1000 ohms to resistor 14 and 10,000 ohms to resistor 20.

From the foregoing it will be recognized that Applicant has provided a simple and straightforward system for compensating for load changes in switched mode power supplies. While only two inductive feedback arrangements have been described, those skilled in the art will recognize that other such arrangements may be used, such as, for example, a third feedback winding to provide "keep alive" power to the input side. Various kinds of power driver circuits may be used so long as, in the current mode topology, a current sensing resistor is provided to provide a feedback of this quantity to the comparator. Those skilled in the art will be aware of other modifications within the scope of the appended claims.

I claim:

1. A switched mode power supply having improved load regulation including an integrator circuit, a comparator circuit connected to said integrator circuit, a square wave generator, and AND circuit connected to said square wave generator, a power driver circuit connected to said AND circuit, an output transformer connected to said power driver circuit, an output circuit including load means connected across a secondary winding of said transformer, a diode connected between one end of said secondary winding and said load and a capacitor connected across said load, feedback means inductively connected to said output circuit and connected to said integrator characterized in that said integrator includes an operational amplifier having a controlled reference signal supplied to its non-inverting input terminal, said feedback means is connected to its inverting input terminal and a resistor is connected between said non-inverting terminal and the output terminal of said operational amplifier to provide positive feedback.

2. A switched mode power supply as claimed in claim 1 wherein said feedback means includes an additional secondary winding on said output transformer, a voltage divider and capacitance means connected across said additional secondary winding, and a diode connected to one end of said additional secondary winding.

3. A switched mode power supply as claimed in claim 1 wherein an oscillator circuit is connected to said comparator circuit providing a sawtooth voltage to said comparator circuit which is compared with the output from said integrator circuit.

4. A switched mode power supply as claimed in claim 1 wherein said driver circuit and said output transformer are arranged in push-pull configuration and a choke is included in said output circuit.

5. A switched mode power supply as claimed in claim 4 wherein said feedback means includes an additional winding on said choke, a diode is connected in series with the said additional winding and a filter circuit connected between said secondary winding of said choke and said inverter circuit.

6. A switched mode power supply as claimed in claim 2, wherein said power driver stage includes a current sensing resistor, and the signal across said resistor is connected in feedback relationship to said comparator circuit.

7. A switched mode power supply as claimed in claim 5 where said power driver stage includes a current sensing resistor, and the signal across said resistor is connected in feedback relationship to said comparator circuit.

8. A switched mode power supply having improved load regulation including an output stage including a transformer having a primary winding and a secondary winding with a load connected across said secondary winding, a power driver circuit connected to said primary winding, said power driver circuit including current sensing means responsive to the peak current flow in said circuit, an AND circuit connected to said power driver, a square wave generator connected to said AND circuit, a comparator circuit connected to said AND circuit including an operational amplifier and means connecting said current sensing means to the inverting terminal of said operational amplifier, an integrator connected to the non-inverting terminal of said operational amplifier, said integrator including a second operational amplifier, a controlled reference voltage connected to the non-inverting terminal of said second operational amplifier, feedback means including inductive means in said output stage connected to the inverting terminal of said second operational amplifier, and resistance means connected between the non-inverting terminal and the output terminal of said second operational amplifier to provide positive feedback compensating for changes in output voltage across said load.

9. A switched mode power supply as claimed in claim 8 wherein said inductive means includes an additional secondary winding in said transformer and a diode connected to one end of said secondary winding.

10. A switched mode power supply as claimed in claim 8 wherein said power driver circuit has a push-pull output, said output transformer has push-pull windings and said inductive means comprises a choke having a secondary winding, a diode connected to said secondary winding, and a filter circuit connected between said secondary winding and said inverting terminal of said second operational amplifier.

* * * * *